(12) United States Patent
Scialdone

(10) Patent No.: US 11,383,921 B1
(45) Date of Patent: Jul. 12, 2022

(54) BEVERAGE DISPENSING SYSTEM AND METHOD

(71) Applicant: Mark Scialdone, San Diego, CA (US)

(72) Inventor: Mark Scialdone, San Diego, CA (US)

(*) Notice: Subject to any disclaimer, the term of this patent is extended or adjusted under 35 U.S.C. 154(b) by 0 days.

(21) Appl. No.: 16/901,781

(22) Filed: Jun. 15, 2020

Related U.S. Application Data

(63) Continuation-in-part of application No. 15/984,336, filed on May 19, 2018, now Pat. No. 10,717,593.

(51) Int. Cl.
*B65D 85/804* (2006.01)
*B67D 1/00* (2006.01)

(52) U.S. Cl.
CPC ....... *B65D 85/8067* (2020.05); *B67D 1/0078* (2013.01); *B67D 2001/0091* (2013.01)

(58) Field of Classification Search
CPC .......... B65D 85/8067; B65D 85/804; B65D 85/816; B65D 85/8043; B65D 85/8046; B01F 15/0205; B01F 15/0206
See application file for complete search history.

(56) References Cited

U.S. PATENT DOCUMENTS

| | | | |
|---|---|---|---|
| 5,470,601 A | 11/1995 | Robertson | |
| 7,604,826 B2 | 10/2009 | Denisart et al. | |
| 9,215,946 B2 | 12/2015 | Jenkins | |
| 10,717,593 B1* | 7/2020 | Scialdone | B65D 85/8067 |
| 2011/0226343 A1 | 9/2011 | Novak et al. | |
| 2014/0272016 A1 | 9/2014 | Novak | |
| 2014/0287105 A1* | 9/2014 | Husband | B65D 65/466 |
| | | | 426/115 |
| 2015/0166257 A1* | 6/2015 | Trombetta | B65D 85/8043 |
| | | | 426/87 |

FOREIGN PATENT DOCUMENTS

| | | |
|---|---|---|
| EP | 1472156 B1 | 3/2006 |
| EP | 1808382 B1 | 3/2013 |
| WO | 03059778 A2 | 7/2003 |

* cited by examiner

*Primary Examiner* — Jason L Vaughan
*Assistant Examiner* — Amanda Kreiling
(74) *Attorney, Agent, or Firm* — Ronald J Koch

(57) ABSTRACT

A system and method is presented wherein a disposable pod having two chambers, each of which can be either wet or dry and contain a variety of substances, is sized to fit distinct brewing systems offered by third parties, such that the puncturing and water dispensing functionality of such brewing systems cause the mixture of the variety of substances in the two chambers resulting in a wide range of beverages.

12 Claims, 8 Drawing Sheets

BEVERAGE DISPENSING SYSTEM AND METHOD

FIELD

The subject technology relates generally to coffee brewing systems, and in particular to coffee brewing systems that utilize a disposable cartridge or pod.

BACKGROUND AND SUMMARY

The subject technology is advantageous over conventional coffee brewing systems that utilize a disposable cartridge, or pod, in that a system and method is presented wherein a disposable pod having two chambers, each of which can be either wet or dry and contain a variety of substances. Such pods can be sized to fit specific brewing systems offered by third parties (such as a KEURIG™ brand brewing system using K CUP Brand™ cartridges). The pods of the subject technology are structured such that the puncturing and water dispensing functionality of such brewing systems cause the mixture of the variety of substances in the two chambers resulting in a wide range of beverages not presently possible with such conventional systems.

REFERENCE NUMERALS IN DRAWINGS

Figure 1:
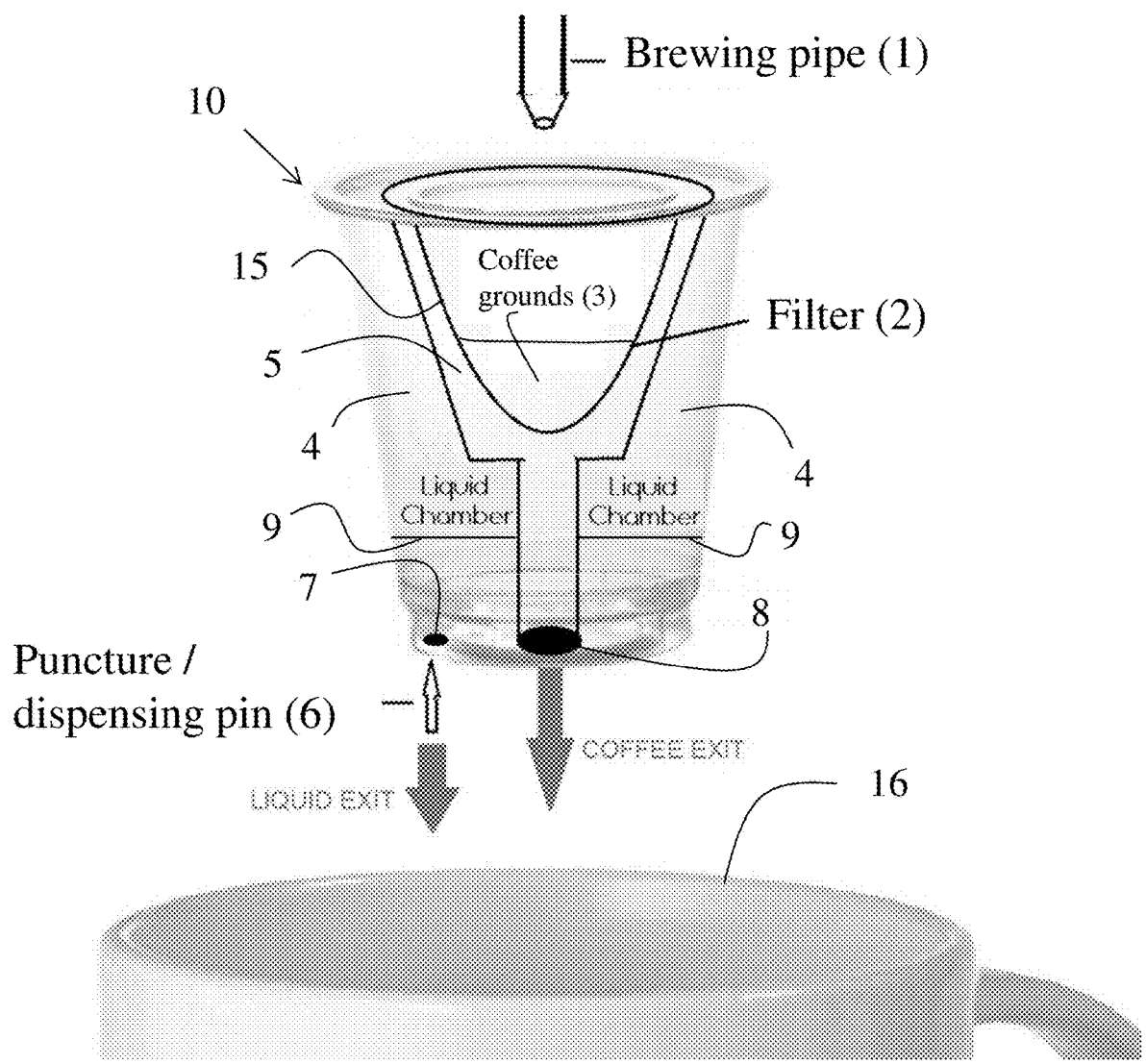
FIG. 1 depicts a front perspective view in one aspect of the invention.

The table below lists the reference numerals employed in the figures, and identifies the element designated by each numeral.

1 brewing pipe 1
2 filter 2 (coffee filter in one aspect of the invention, flexible fabric enclosure in other aspects of the invention)
3 first substance 3 (particulate substance, in one aspect of the invention, coffee grounds in another aspect of the invention)
4 first chamber 4 (liquid chamber in one aspect of the invention)
5 second chamber 5
6 puncture/dispensing pin 6
7 location of first dispensing port 7
8 second dispensing port 8
9 second substance 9 (alcohol in one aspect of the invention)
10 cartridge 10
11 upper portion 11 of the second chamber 5
12 lower portion 12 of the second chamber 5
13 top portion 13 of the cartridge 10
14 seal 14
15 third chamber 15
16 container 16 (e.g. coffee mug)
17 third substance 17 (e.g. water)
18 proximal portion 18 of the upper portion 11 of the second chamber 5
19 distal portion 19 of the upper portion 11 of the second chamber 5
20 proximal portion 20 of the lower portion 12 of the second chamber 5
21 distal portion 21 of the lower portion 12 of the second chamber 5
50 third chamber 50 (additional aspect)
52 plug 52
54 bottom portion 54
56 first puncture point 56
58 second puncture point 58
59 cartridge 59
60 first chamber 60 of cartridge 59
61 first substance 61 of cartridge 59
62 second chamber 62 of cartridge 59
63 second substance 63 of cartridge 59
64 puncture point 64 of cartridge 59
65 seal 65 of cartridge 59
66 first discharge port 66 of cartridge 59
68 second discharge port 68 of cartridge 59

DETAILED DESCRIPTION

Figure 2A:
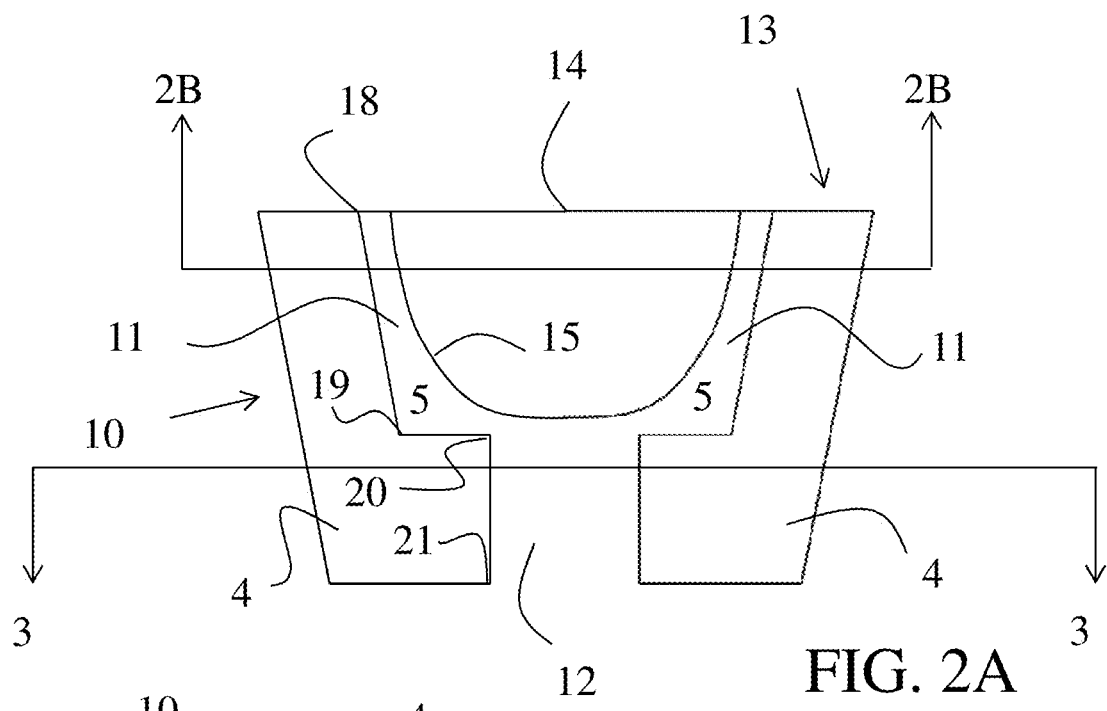
FIG. 2A depicts a cross sectional view taken along the line shown in FIG. 2B
Figure 2B:
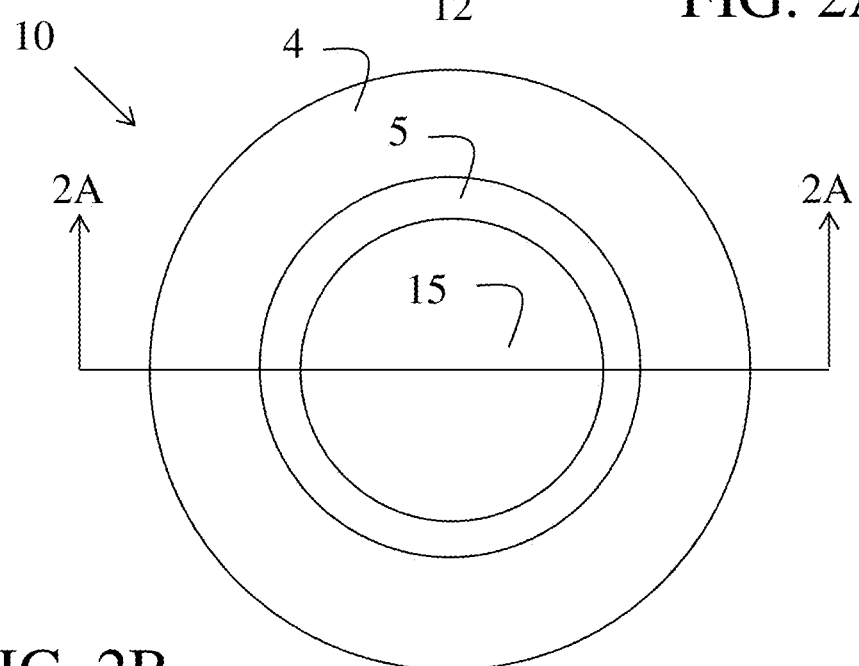
FIG. 2B depicts a top view of cartridge 10
Figure 3:
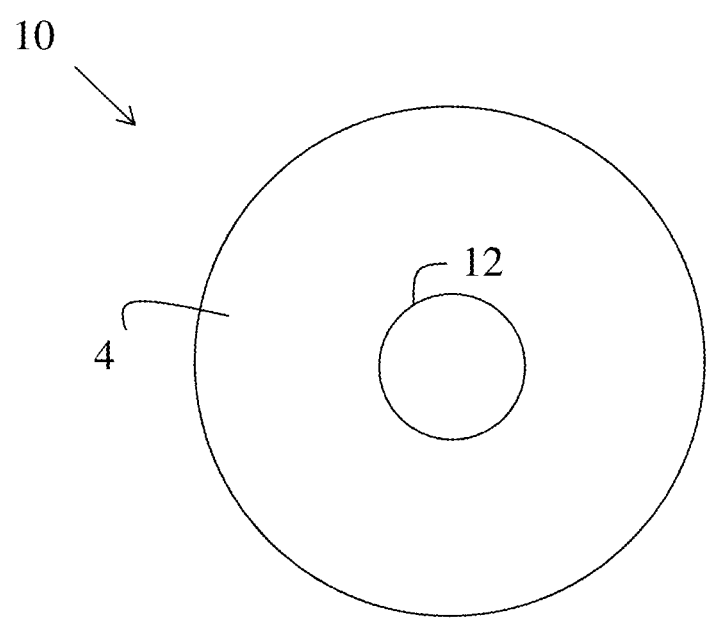
FIG. 3 depicts a cross sectional view taken along the line shown in FIG. 2A

In one aspect, a beverage dispensing system comprises, a cartridge 10 having: a first chamber 4; a second chamber 5 being radially inside of the first chamber 4, the second chamber 5 having upper and lower portions 11, 12; a third chamber 15; the third chamber 15 being adapted to contain a first substance 3; and a seal 14, the seal being capable of providing seal functionality and being punctured. In one aspect (e.g. FIG. 2A) seal 14 seals an upper portion of first, second, and third chambers 4, 5, & 15.

Figure 4:
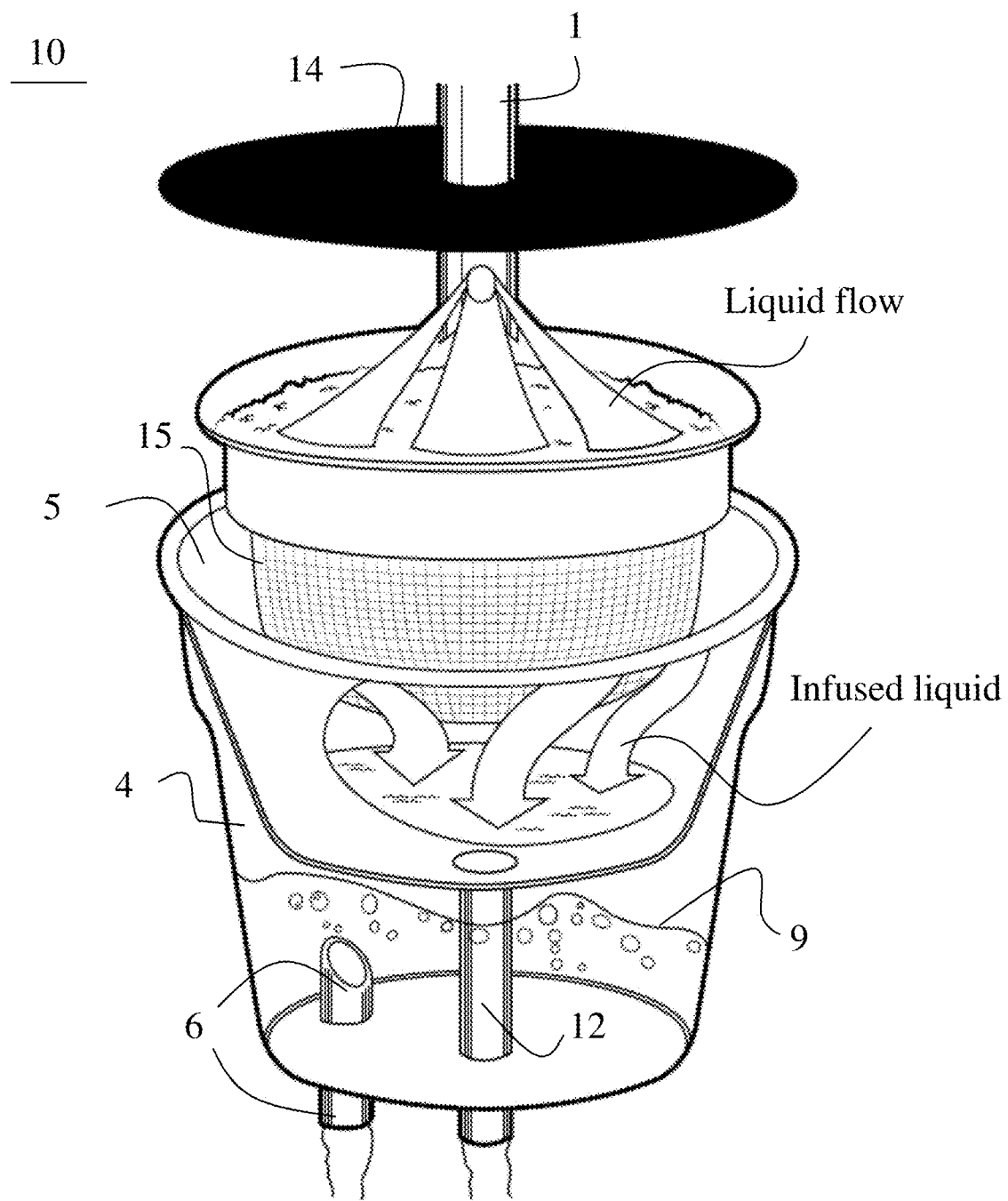
FIG. 4 depicts a perspective x-ray view in one aspect of the subject technology

In one aspect (FIG. 2A), lower portion 12 is radially smaller in diameter than upper portion 11, upper portion 11 has a downwardly tapering side profile, and lower portion 12 is not tapered. In one aspect (FIG. 4), lower portion 12 extends outwardly, or protrudes, from cartridge 10.

In one aspect (FIG. 1) third chamber 15 comprises a coffee filter 2. In another aspect, third chamber 15 comprises a flexible fabric enclosure. In one aspect, third chamber 15 comprises a coffee filter containing coffee grounds. It should be noted that other types of filters can be used in conjunction with coffee, tea, or other particulate substances. In another aspect, third chamber 15 comprises a sealed fluid containing membrane that can be unsealed by pressure or puncture.

In one aspect, seal 14 is adapted to be punctured by a brewing pipe 1 of a single serve coffee brewing system, the brewing pipe 1 being capable of dispensing water into the third chamber 15.

In one aspect, the third chamber 15 is inside of the upper portion 11 of the second chamber 5, the first chamber 4 is completely sealed and adapted to contain a second substance 9, the first chamber 4 is adapted to be capable of being punctured to release the second substance 9, and the seal 14 is adapted to be capable of being punctured to allow a third substance 17 (e.g. water) to enter the third chamber 15 and comingle with the first substance 3, a portion of the combination of the first substance 3 and the third substance 17 flowing outwardly through the lower portion 12 of the second chamber 5. In one aspect, second substance 9 is released into a container 16.

As used, the term "comingle" is understood to be analogous to the operation of a drip brewing coffee system, or alternatively a pressurized system wherein the water is infused with coffee. In one aspect, the combination of the first substance 3 and the third substance 17 flows outwardly through the lower portion 12 of the second chamber 5 into a container 16.

In one aspect, the first chamber 4 is adapted to contain a fluid (e.g. alcohol), the first chamber 4 is capable of being punctured by a puncture/dispensing pin 6 of a coffee brewing system thus allowing the second substance 9 to flow from the first chamber 4. Thus, the subject technology can be used in conjunction with a conventional coffee brewing system (such as a KEURIG™ brand brewing system using K CUP Brand™ cartridges), the cartridge 10 being sized accordingly. Whereas a conventional system contains only coffee in a filter, the subject technology is configured such that the second substance 9 is released upon puncture of the first chamber 4. Thus, the subject technology offers an advantage because the second substance 9 (e.g. alcohol) is released along with brewed coffee; instead of flowing through first dispensing port 7, the brewed coffee flows through second dispensing port 8 and the second substance 9 flows through first dispensing port 7. In one aspect, the first chamber 4 is hermetically sealed. Those of skill in the art will appreciate that cartridge 10 can be configured to fit a variety of brewing systems, including single serve coffee dispensers.

In one aspect, the upper portion 11 of the second chamber 5 has a downwardly tapering side profile (e.g. FIG. 2A) wherein a proximal portion 18 of the upper portion 11 has a larger diameter than a distal portion 19 of the upper portion 11, and the upper portion 11 of the second chamber 5 is in fluid communication with the lower portion 12 of the second chamber 5.

In one aspect, brewed coffee flows from the upper portion 11 through the lower portion 12 into a container 16 (e.g. coffee cup) wherein the brewed coffee is mixed with the second substance 9 (e.g. alcohol), resulting in a caffeinated alcoholic beverage. It should be understood that myriad mixtures of substances are possible, wet or dry, including coffee, tea, alcohol, flavoring, syrups, extracts, and juices.

In one aspect, the distal portion 19 of the upper portion 11 has a larger diameter than the lower portion 12 of the second chamber 5. In one aspect, distal portion 21 of the lower portion 12 is open. In this aspect, the distal portion 21 is open, and the entire cartridge 10 is packaged in an airtight, or vacuum package, to preserve the freshness of the first substance 3 (e.g. coffee grounds). In another aspect, the distal portion 21 of the lower portion 12 is sealed. In this aspect, the seal is adapted to be capable of being punctured by the various means as described herein as well as those known to those of skill in the art.

Figure 5:
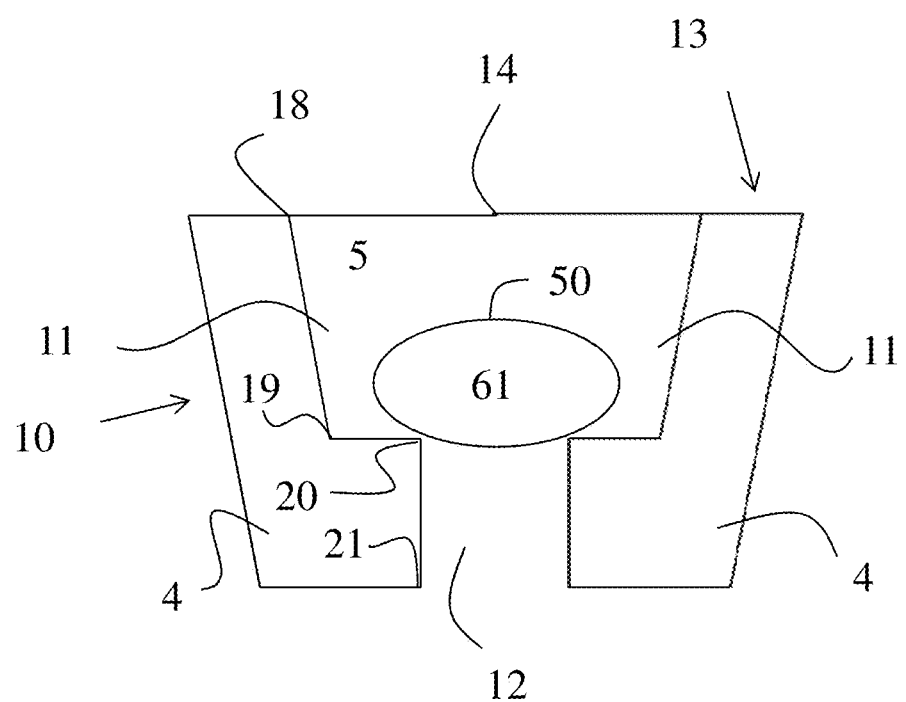
FIG. 5 depicts a variation of FIG. 2A

Referring now to FIG. 5, in one aspect, a beverage dispensing system comprises a cartridge 10 having: a first chamber 4; a second chamber 5 being radially inside of the first chamber, the second chamber 5 having upper and lower portions 11, 12; and a seal 14, the seal being capable of being punctured, the seal being adapted to seal at least a portion of the first and second chambers 4, 5.

It should be understood that the shape of the upper and lower portions 11, 12 (as shown in various aspects herein) can be varied. In one aspect, the walls of either or both are tapered. As shown, in FIG. 5 for example, the walls of the upper portion 11 of the second chamber 5 are tapered, as is the wall of first chamber 4. Although not shown, the walls of lower portion 12 can also be tapered.

In other aspects, the diameters of the upper and lower portions 11, 12 can be varied, as can the diameter of the cartridge 10. As shown, in FIG. 5 for example, the diameter of lower portion 12 is smaller than the diameter of both proximal and distal portions 18, 19 of the upper portion 11.

With continued reference to FIG. 5, in one aspect, the beverage dispensing system further comprises a third chamber 50, the third chamber being adapted to contain a first substance 61 (e.g. coffee or tea); the third chamber being inside of the upper portion 11 of the second chamber 5.

In one aspect, the seal 14 is adapted to be capable of being punctured to allow a second substance to enter the second chamber 5 and permeate the third chamber 50 and comingle with the first substance 61, a portion of the combination of the first substance and the second substance flowing outwardly through the lower portion 12 of the second chamber 5.

As shown in FIG. 5, in one aspect, a third chamber 50 is free floating within second chamber 5. In one aspect, the third chamber 50 comprises a pouch. In one aspect, third chamber 50 is relatively larger than lower portion 12 such that third chamber 50 is retained within second chamber 5.

Figure 6:
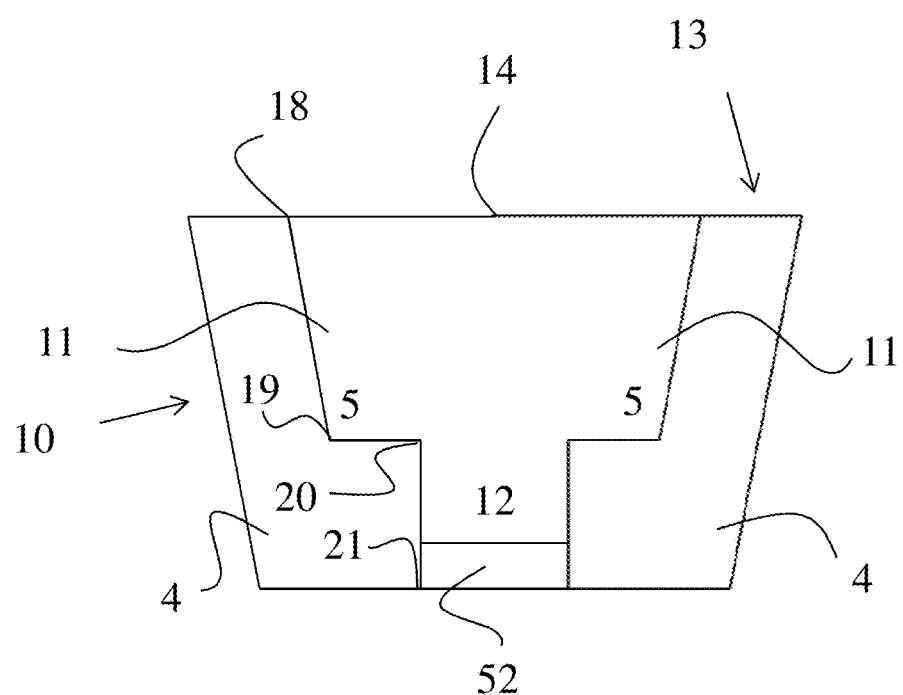
FIG. 6 depicts a variation of FIG. 2A

Referring now to FIG. 6, a plug 52 is adapted to regulate flow through distal portion 21 of the lower portion 12 of the second chamber 5. In a closed condition, the plug completely closes off distal portion 21 of the lower portion 12 of the second chamber 5. It is to be understood that FIG. 6 depicts various aspects, including third chamber 15 (shown) or alternatively third chamber 50 (e.g. a pouch).

In one aspect, the plug 52 is a peel away sticker. In one aspect, the plug 52 is adapted to dissolve. Those of skill in the art will appreciate that various known materials can be used that dissolve upon exposure to moisture, heat, or other conditions.

In one aspect, the plug 52 is adapted to dislodge under a pre-selected pressure. This feature can be achieved for instance upon a pressurized delivery of liquid into the second chamber 5. In other aspects, a combination of heat and pressure conditions can be used wherein the plug partially dissolves due to heat which causes the plug to be more susceptible to pressure which thereby dislodges the plug.

In one aspect, the plug 52 comprises a one-way valve. Those of skill in the art will appreciate the various one-way valves available, such as for example those that adhere to a hole for degassing of coffee bags.

Figure 7:
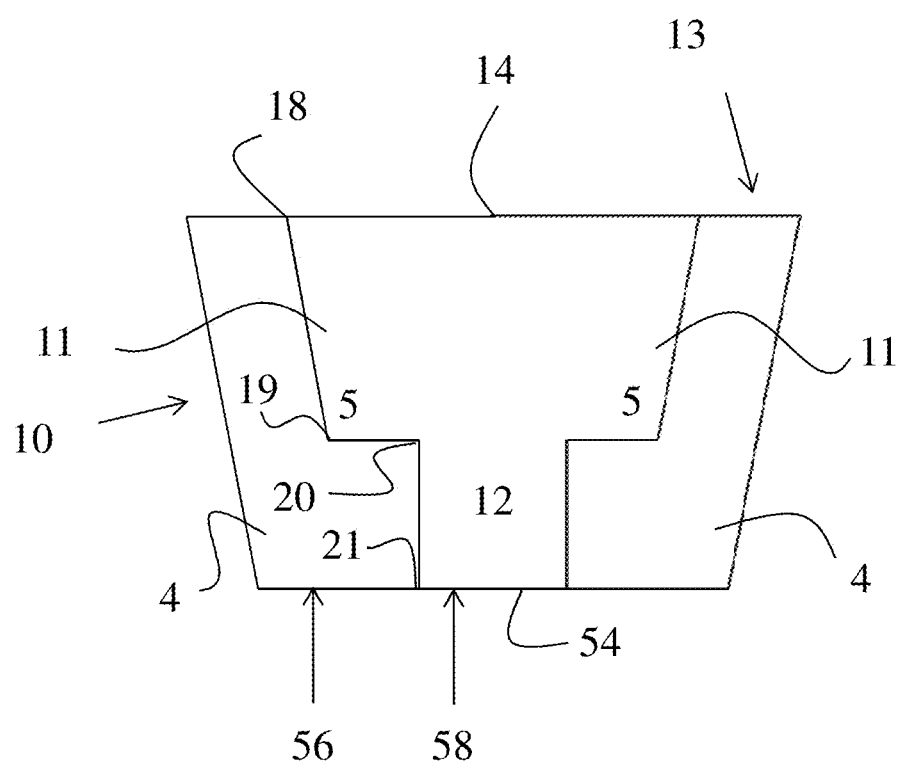
FIG. 7 depicts a variation of FIG. 2A

Turning now to FIG. 7, in one aspect, the cartridge 10 has a bottom portion 54. In one aspect, the bottom portion 54 is adapted to be capable of being punctured. As shown in FIG. 7, first and second puncture points 56, 58 are located so as to cause the first and second chambers 4,5, respectively, to be drained. In one aspect, the bottom portion 54 comprises a removable sticker.

In one aspect, the puncture points 56, 58 are adapted to be fitted with one-way valves which can be adhered over puncture holes. In another aspect, plugs are used to achieve the draining functionality as described elsewhere herein.

Figure 8:
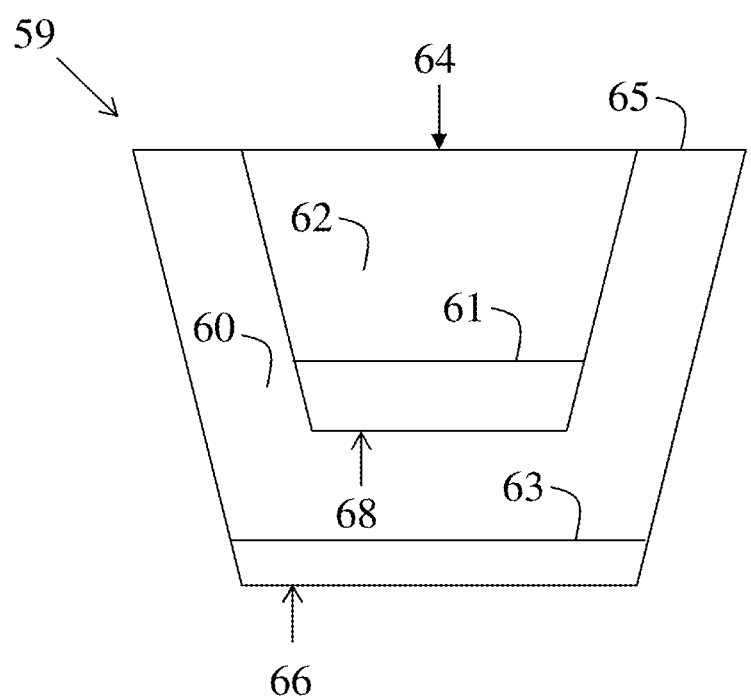
FIG. 8 depicts a cartridge in one aspect of the subject technology

Turning now to FIG. 8, in one aspect, a cartridge 59 has a first chamber 60; a second chamber 62 being radially inside of the first chamber; and a seal 65; the first chamber having a first discharge port 66; and the second chamber having a second discharge port 68. In one aspect, the seal is capable of being punctured. In one aspect, the seal is adapted to seal at least a portion of the first and second chambers.

As shown in FIG. 8, in one aspect, the first and second discharge ports 66, 68, are each disposed proximate a bottom portion of the first and second chambers 60, 62, respectively.

In one aspect, either or both of the first and second discharge ports 66, 68 comprises a punctured hole. In one aspect, either or both of the first and second discharge ports 66, 68 comprises a plug that is adapted to become at least partially removed upon the occurrence of a pre-established condition (e.g. temperature, pressure, physical force, puncture) in accordance with such other aspects as described herein. In one aspect, either or both of the first and second discharge ports 66, 68 comprises a one-way valve.

In some aspects, the plugs described herein are adapted to be fast acting, slow acting, or some intermediate temporal condition to achieve an advantage of time release according to pre-selected or user customizable criteria. In some aspects, the plugs described herein comprise one-way valves. In some aspects, the plugs described herein comprise peel away stickers.

In operation, the internal two-chamber technology described for example in FIG. 8 in one aspect is achieved by the first chamber 60 being a wet chamber (e.g. liquid flavoring), and the second chamber 62 being a dry chamber (e.g. coffee or tea) wherein the seal 65 is punctured so as to allow a liquid (e.g. water) to be dispensed (either under pressure or not) into the second chamber 62 whereby the liquid mixes with a dry substance in the second chamber; thereafter, upon the occurrence of a pre-selected condition (e.g. heat or pressure) the functionality of the second discharge port 68 is invoked to allow the mixture in the second chamber to enter the first chamber whereby the contents of the first chamber are mixed with the discharged contents of the second chamber; thereafter, at some pre-established interval or condition, the functionality of the second discharge port is invoked to release the contents. It should be understood that the discharge functionality can be achieve using the various aspects as described herein.

While this invention has been shown and described with respect to detailed embodiments thereof, it will be understood by those skilled in the art that changes in form and detail thereof may be made without departing from the scope of the claims of the invention.

The invention is in no way limited to the specifics of any particular embodiments and examples disclosed herein. For example, the terms "aspect," "example," "preferably," "alternatively," and the like denote features that may be preferable but not essential to include in some embodiments of the invention. In addition, details illustrated or disclosed with respect to any one aspect of the invention may be used with other aspects of the invention. Additional elements and/or steps may be added to various aspects of the invention and/or some disclosed elements and/or steps may be subtracted from various aspects of the invention without departing from the scope of the invention. Singular elements/steps imply plural elements/steps and vice versa. Some steps may be performed serially, in parallel, in a pipelined manner, or in different orders than disclosed herein. Many other variations are possible which remain within the content, scope, and spirit of the invention, and these variations would become clear to those skilled in the art after perusal of this application.

What is claimed is:

1. A beverage dispensing system comprising:
   a cartridge having:
      a first chamber;
      a second chamber being radially inside of the first chamber, the second chamber having upper and lower portions;
      and a seal, the seal being capable of being punctured, the seal being adapted to seal at least a portion of the first and second chambers;
   a plug disposed proximate a distal portion of the lower portion of the second chamber.

2. The beverage dispensing system of claim 1 further comprising:
   the plug is a peel away sticker.

3. The beverage dispensing system of claim 1 further comprising:
   the plug is adapted to dissolve.

4. The beverage dispensing system of claim 1 further comprising:
   the plug is adapted to deteriorate when heated.

5. The beverage dispensing system of claim 1 further comprising:
   the plug is adapted to dislodge under a pre-selected pressure.

6. The beverage dispensing system of claim 1 further comprising:
   the plug comprises a one-way valve.

7. The beverage dispensing system of claim 1 further comprising:
   a bottom portion being adapted to be capable of being punctured so as to release fluid from the second chamber.

8. The beverage dispensing system of claim 1 further comprising:
   a the bottom portion being adapted to be capable of being punctured so as to release fluid from the first and second chambers.

9. The beverage dispensing system of claim 1 further comprising:
   a bottom portion comprising a removable sticker.

10. A beverage dispensing system comprising:
    a cartridge having:
       a first chamber;
       a second chamber being radially inside of the first chamber;
       and a seal, the seal being capable of being punctured, the seal being adapted to seal at least a portion of the first and second chambers;
    the first chamber has a first discharge port;
    the second chamber has a second discharge port.

11. The beverage dispensing system of claim 10 further comprising:
    the first discharge port comprises a punctured hole.

12. The beverage dispensing system of claim 10 further comprising:
    the second discharge port comprises a plug that is adapted to become at least partially removed upon the occurrence of a pre-established condition.

* * * * *